March 18, 1924.  K. SCHERER  1,487,480
AUTOMOBILE LOCK
Filed Aug. 11, 1921
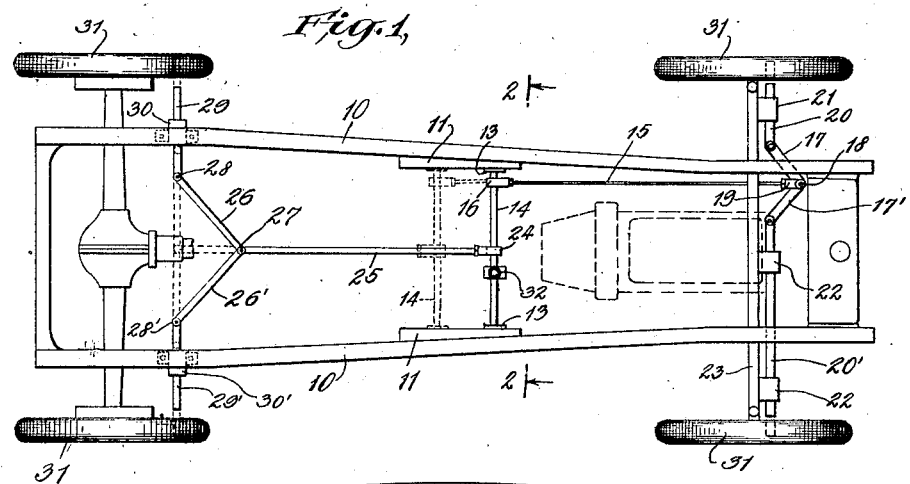
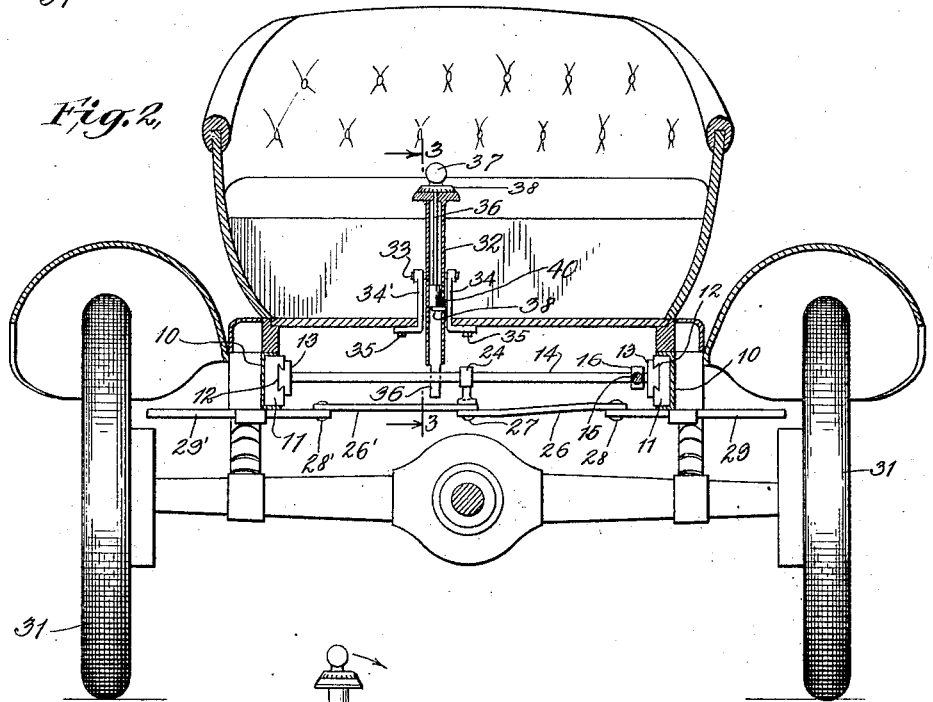
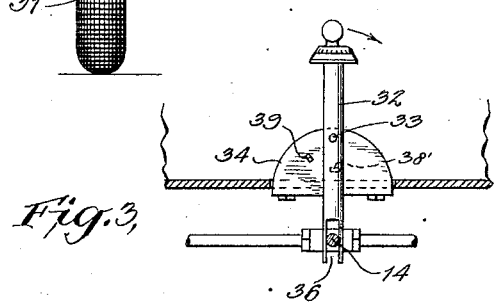
INVENTOR
KARL SCHERER
BY
ATTORNEY Patented Mar. 18, 1924.

1,487,480

UNITED STATES PATENT OFFICE.

KARL SCHERER, OF NEW YORK, N. Y.

AUTOMOBILE LOCK.

Application filed August 11, 1921. Serial No. 491,324.

*To all whom it may concern:*

Be it known that KARL SCHERER, citizen of the United States, and resident of the city of New York, in the county of New York and State of New York, has invented certain new and useful Improvements in Automobile Locks, of which the following is a specification.

This invention relates to automobile locks. More particularly, it is directed to locking devices for preventing theft of automobiles or the like vehicles.

One object of this invention is to provide a locking device of the character described which shall be simple in construction and sure and effective in operation to a high degree.

Another object is to provide a device of the character described which shall be adapted to serve simultaneously both as a locking device for preventing theft of the vehicle and as an emergency brake.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a plan view of a vehicle provided with an embodiment of this invention and showing the latter in both operative and inoperative position;

Fig. 2 is a cross-sectional view cut along line 2—2 of Fig. 1 and showing the locking device in front elevation with some of the parts in cross-section; and Fig. 3 is a detailed partial cross-sectional view taken along line 3—3 of Fig. 2.

Referring in detail to the drawing, 10, 10 indicate the sides of the automobile chassis. Secured to each of these sides in any suitable manner are guide pieces 11, 11 each formed with a dovetail or other suitable groove 12, 12 in which are adapted to slide the dovetailed slide members 13, 13. These slide members are carried by a cross piece 14 extending across the width of the chassis and which cross-piece is adapted to be reciprocated in said channels 12 in the manner hereinafter described. The rod 15 is rigidly secured adjacent one end of said cross-member and transversely thereof by means such as the sleeve 16. At the remote end of the rod 15 is a toggle member comprising a pair of arms 17, 17' pivoted as at 18 to the link 19 which is secured to the rod 15. Pivoted to each of the other ends of the arms 17, 17' is a rod 20, 20' arranged parallel to the cross member 14 supported respectively in suitable bearings 21, 22 carried by the front axle 23. Adjacent the middle of the cross piece 14 is similarly secured as by means of the sleeve 24 another transverse rod 25 terminating in another toggle comprising the pair of arms 26, 26', both pivotally held together as at 27 to the rod 25. The arms 26, 26' pivotally carry as at 28, 28' rods 29, 29' arranged parallel to the cross-member 14 and supported in bearings 30, 30' secured to the chassis frame. These pairs of rods 20, 20' and 29, 29' are of such length and thickness as to engage between the spokes of the wheels 31 when moved into the engaging position by the operating mechanism in the manner now to be described.

This mechanism comprises the rock shaft 32 pivotally supported as at 33 between a pair of plates 34, 34' secured to the frame work of the vehicle as at 35. This rock shaft has its lower end bifurcated as at 36 so as to straddle the cross-member 14 and as the rock shaft is swung back and forth in a vertical plane about its pivot, it will reciprocate this cross member 14 in the channel guide pieces 11, 11 as will be readily understood. When the rock shaft is thrown in the direction indicated by the arrow in Fig. 3, the cross piece 14 moves into the dotted position shown in Fig. 1 carrying with it the rod 15 so as to produce a pull on the toggle joint causing the arm 17, 17' to flatten out into substantially a straight line, and at the same time forcing the brake rods 20, 20' to enter between the spokes of the front wheels. At the same time, the rod 25 moves backward and pushes against the arms 26, 26' causing these to flatten out into a straight line as shown dotted in Fig. 1 and thus forcing the brake rods 29, 29' between the spokes of the rear wheels. In this position, the wheels are locked and the vehicle cannot be driven off except upon a reverse operation of the rock shaft.

In order to lock the rock shaft in the brake position, this shaft is preferably made hollow to form a housing for a safe lock device substantially similar to the ordinary combination safe locks. In the form shown in the drawing, a rod 36 having a head portion 37 and a dial 38 is arranged for rotation within said rock shaft. This rod 36 carries at the end a projection or locking bolt member 38' adapted to enter into an opening 39 in one of the plates 34. Within the rock shaft is a casing 40 which contains the tumblers (not shown) arranged to operate the combination so that when the dial is turned after the bolt 38 is registered in the opening 39, it is no longer possible to move the rock shaft except upon unlocking the tumblers through rotation of the dial in the usual manner of combination locks.

It will be noted that when the vehicle is running, the rock shaft may be left free for operation so that the operator or chauffeur who is located in the seat right behind the rock shaft may use the same as an emergency brake.

It will thus be seen that there is provided apparatus in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A locking device for automobiles and like vehicles, comprising a vehicle frame, locking members adapted to engage the wheels of the vehicle, means for moving said locking members in and out of engagement with said wheels, said means comprising guideways on the frame, a member slidable in said guideways, a rock shaft operably connected to said member, a rod also connected to said member, and link connections between said rod and said locking members whereby the operation of said slide member operates said link connections to urge said locking members into and out of engagement with the wheels of the vehicle.

2. A locking device for automobiles and the like vehicles having a chassis portion comprising a pair of guides secured to the sides of said chassis, a cross member extending transversely of said sides and carrying slide members adapted to be reciprocated within said guides, a rod secured to said cross member and extending toward the rear portion of the vehicle, another rod secured to said cross member and extending to the front of the vehicle, and toggle joints operatively secured respectively to each of said rods, and brake members pivoted to the arms of said toggle joints, and means for reciprocating said cross member as and for the purpose described and specified.

Signed at New York city, in the county of New York and State of New York, this 5th day of August 1921.

KARL SCHERER.